March 17, 1970 — R. L. ROACH — 3,501,175
SEALED VESSELS
Original Filed Sept. 24, 1957 — 2 Sheets-Sheet 1

INVENTOR.
ROBERT LEE ROACH
BY
ATTORNEY.

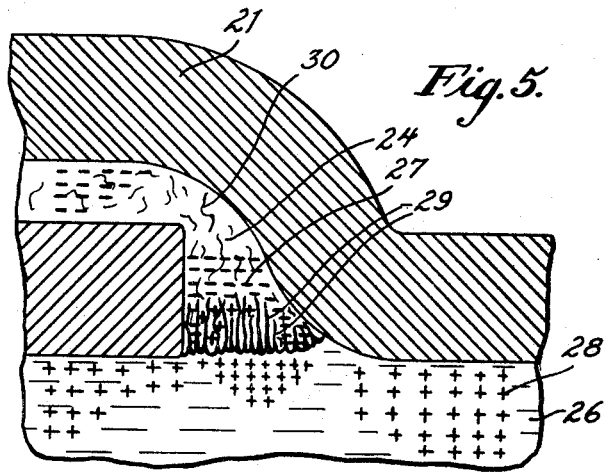
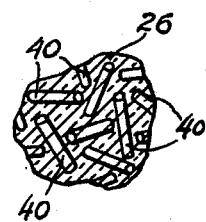
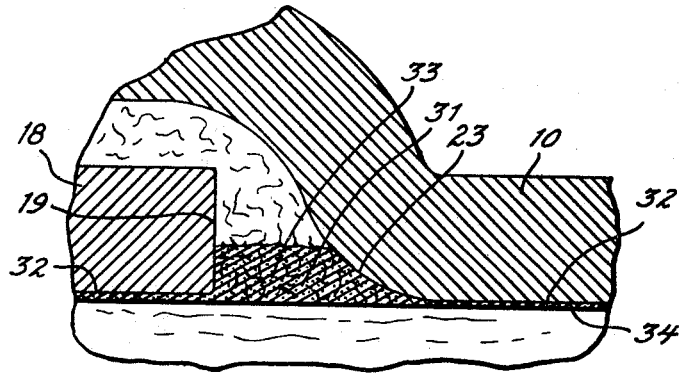
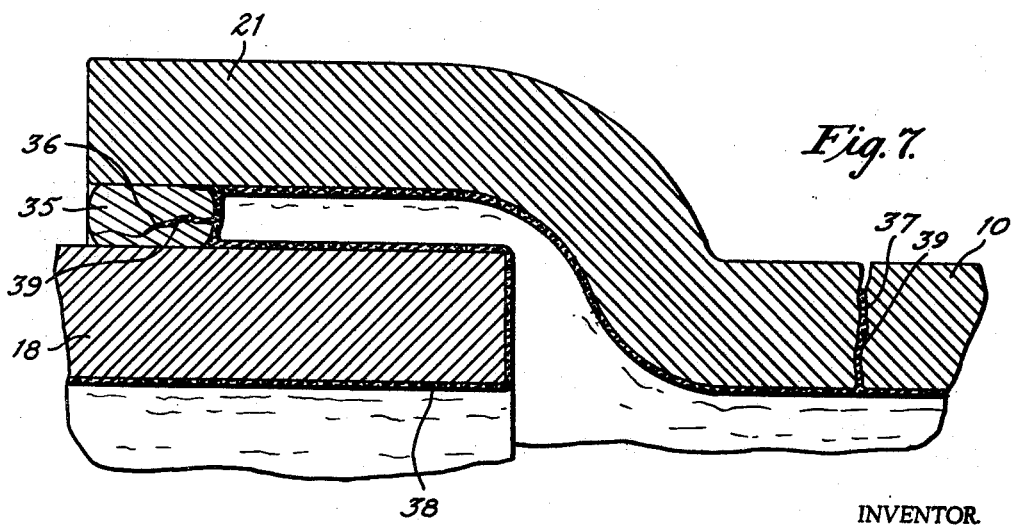

United States Patent Office 3,501,175
Patented Mar. 17, 1970

1

3,501,175
SEALED VESSELS
Robert Lee Roach, West Chester, Pa., assignor to West Chester Chemical Company, West Chester, Pa., a partnership
Application Sept. 24, 1957, Ser. No. 685,784, which is a division of application Ser. No. 115,099, June 6, 1961, now Patent No. 3,272,894, dated Sept. 13, 1966. Divided and this application Sept. 8, 1966, Ser. No. 577,954
Int. Cl. F16l 13/00
U.S. Cl. 285—295                        15 Claims

ABSTRACT OF THE DISCLOSURE

A vessel and a joint which is sealed against gas escaping therefrom by means of a cured cationic neoprene latex sealant composition of a specific type which adheres to and coats the interior wall of said vessel or joint and plugs their interstices, fissures or other structural defects.

---

My invention relates to sealed vessels. This application is a division of application Ser. No. 115,099, filed June 6, 1961 now U.S. Patent No. 3,272,894, which itself is a division of application Ser. No. 685,784 filed Sept. 24, 1957, and now abandoned.

In the use of underground conduits, as for instance those consisting of pipelines comprising bell and spigot joints, serious problems have arisen, particularly in instances where the conduit is used for conveying illuminating gas. In communities where such conduits were laid for manufactured illuminating gas, it has been customary for the bell and spigot joints to be packed with caulked jute or other fibrous materials, and the outside of the joint itself caulked. The water vapor content of manufactured gas was sufficient to keep the jute in a swollen state and thereby maintain the joint in fully packed condition. In communities of this kind, where manufactured gas was replaced by natural gas, it was discovered that instead of retaining the moisture in the jute packing, the flow of dry natural gas aspirated the moisture out of the jute packing, thereby effecting a shrinkage of the jute. This in many instances resulted in the formation of leaks in the bell and spigot joints. Moreover, such pipe lines were, as a rule, laid in the bed of streets and are subject to the stresses of forces transmitted to them by the pounding and vibration of vehicular traffic on said streets, or by settling of the pipe due to undermining or other causes. So long as the jute remained charged with moisture, the packing was sufficiently resilient to yield to these forces without relinquishing its packing pressure. But when the jute was dried out, it lost its internal pressure which forced the packing fibers into resilient contact one with another, and against the walls of the bell and spigot joint or the caulking thereof. Instead, said pounding and vibration or settling forces not only tend to maneuver the dry jute loose from said walls or caulking, but also tend to separate the dry fibers of the jute, one from another. Thus the tendency toward leakage is further enhanced.

Hitherto, such leaks were corrected either by removing the pavement and experimentally digging down to the pipe in an effort first to locate the leak and then to remedy the same by replacing or cementing the packing, or by the use of expensive and complex machinery for larger diameter pipes to locate a given joint and internally apply cement thereto. In either event, the process was not only uncertain and costly but required the gas main to be out of use for a relatively long time. Moreover, attempts to restore the swollen state of the fibrous packing have had fugitive results, due to drying or leaching of the material used.

I have discovered that by the use of a new process involved in my invention, it is possible to seal a conduit or vessel, whether of the gas main type or otherwise, and whether it incorporates a jute or other fiber packing or otherwise, without removing the paving or digging, or using expensive or complex machinery. Moreover, it is accomplished in a minimum of time and with a maximum assurance that the leak will be readily found and completely sealed, the sealing being dependable and substantially permanent, and without adversely affecting the flow or nature of the fluid carried or held by said conduit or vessel. Not only so, but my invention makes it possible to seal actual fissures in the conduit or vessel, which formerly would require patching, caulking or actual replacement.

In the practice of my invention, I employ a sealant which is pumped or otherwise introduced into the interior of the conduit or vessel while in a liquid state until the receptacle is as nearly full as possible. By a combination of capillary action, hydrostatic pressure, and ionic attraction, the sealant flows into and penetrates the fissure or joint, filling the spaces therein and particularly filling the interstices between the adjacent fibers of the packing and between the packing and the walls or caulking of the joint, and substantially wetting said walls or caulking in the process. The excess liquid sealant is then pumped or otherwise drawn out of said interior, leaving a thin film of said sealant deposited against the walls and packing. The sealant is of such a nature as not only to penetrate the interstices between adjacent fibers, but also to deposit a filler therein while at the same time embracing said fibers in such a manner as to utilize the fibers as fillers; and then on drying after the withdrawal of said excess from the interior, to cure in a relatively short time, changing the general physical characteristics from a liquid to an elastic, tough, and rubbery mass which itself packs the fissures, and cements the fibers together while anchoring the whole mass of fibers into the joint.

For the purpose of illustrating my invention, I have shown in the accompanying drawings forms thereof which are at present preferred by me, since the same have been found to give satisfactory and reliable results, although it is to be understood that the various instrumentalities of which my invention consists can be variously arranged and organized, and that my invention is not limited to the precise arrangements and organizations of the instrumentalities as herein shown and described.

Referring now to the drawings:

FIGURE 5 represents a greatly enlarged view of a section of the bell and spigot joint illustrated in FIGURE 2, illustrating the penetration of the filamentous packing by means of ionic attraction, in accordance with the process of my invention.

FIGURE 6 represents a section view similar to FIGURE 5, illustrating the coagulated sealant embracing the fibers of the penetrated packing, following the withdrawal of excess sealant from the vessel, in accordance with my invention.

FIGURE 7 represents a greatly enlarged view of a section of a bell and spigot joint in which caulking was used in place of fiber, and in which leakes were formed through the caulking and through a wall of the vessel, said joint having thereafter been sealed by means of the process of my invention.

FIGURE 8 represents a magnified view of sealant containing fiber-type fillers in accordance with my invention.

Figure 2:
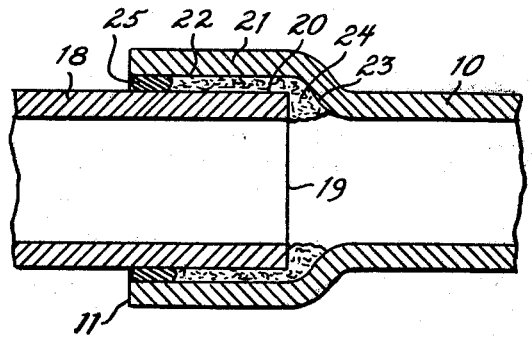
FIGURE 2 represents an enlarged sectional view of the bell and spigot joint illustrated in FIGURE 1 before the application of my process thereto.

While my invention is adapted for use with substantially any type of conduit, reservoir, vessel or container, any of which may hereafter be referred to as a "vessel", for purposes of illustration only, the accompanying drawings illustrate a gas main having a bell and spigot joint. Thus, the gas main may be referred to generally by the reference numeral 10, and comprises a bell and spigot joint 11, a fitting 12 and a cut-off valve 13. The fitting 12 is adapted to have connected therewith a suitable conduit 14 leading from a pump 15 which in turn is connected to a reservoir 16 by any suitable means 17, operably to transfer the contents of the reservoir into the interior of the gas main 10 wherein said contents may remain under pressure, and then to withdraw the excess contents from said gas main and back into the reservoir 16.

The bell and spigot joint 11 comprises the spigot 18 having an end edge 19 and an end exterior wall region 20 inserted within the bell 21 having an interior wall region 22 and an interior seat portion 23. Filamentous packing such for instance as jute 24 may be disposed between the spigot 18 and the bell 21 in a manner to be tightly packed between the exterior wall region 20 of the spigot 18 and the interior wall 22 of the bell 21, and between the end edge 19 of the spigot 18 and the seal portion 23 of the bell 21. Additional caulking such for instance as lead or other suitable material 25 may be disposed between the spigot 18 and bell 21 and exterior of the filamentous packing 24.

Figure 3:
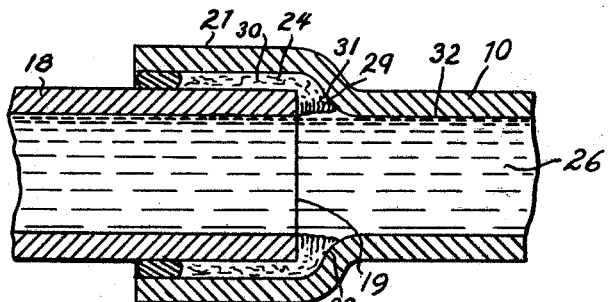
FIGURE 3 represents a sectional view similar to FIGURE 2, and illustrating one stage of my process, wherein the interior of the vessel is substantially filled with a sealant in accordance with my invention.
Figure 4:
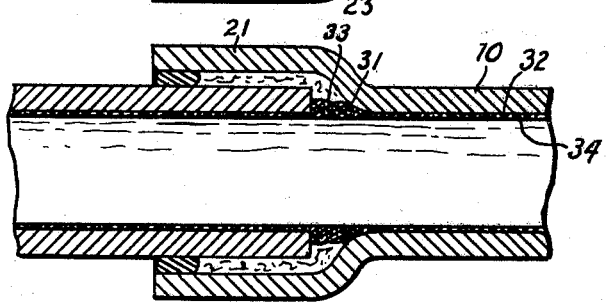
FIGURE 4 represents a sectional view similar to FIGURE 2 and illustrating a subsequent stage of my process, in which all excess liquid sealant has been evacuated, leaving a thin rubbery film adhering to the interior of the vessel and united to a tough, rubbery mass reenforced by the fibers of the original packing, in accordance with my invention.
Figure 1:
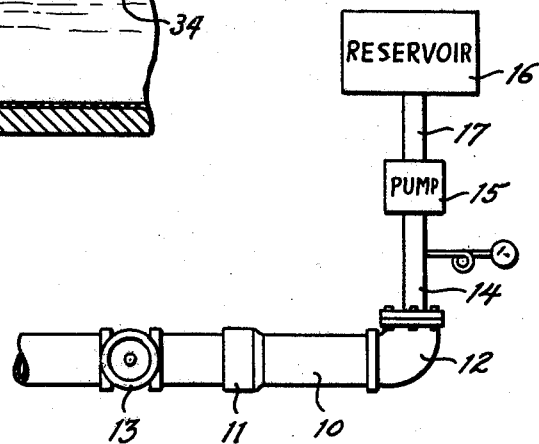
FIGURE 1 represents a diagrammatic view of a vessel such as a gas main being internally sealed in accordance with the process of my invention.

When it is desired to seal this joint in accordance with the process of my invention, the conduit 14 may be fitted to the gas main 20, and if desired the cut-off valve 13 may be closed. A sealant 26 of a type preferably comprising a liquid dispersion of elastomeric rubbery solids, a stabilizing agent, a curing agent, a low temperature cure accelerator and reenforcing material, and which may bear a cationic charge, may be carried in the reservoir 16 and may then be led out of said reservoir and into the interior of the gas main 10 by means of the pump 15 until the interior of the gas main 10 is substantially full, as illustrated in FIGURE 3. The sealant 26 then penetrates the interstices between the filaments in the packing 24, and all fissures wherever said sealant comes in contact with them. This is accomplished not merely by the pressure of the liquid sealant 26 within the vessel 10 tending to force itself through said interstices and fissures, or the normal capillary attraction between the surfaces surrounding said openings and said liquid, but also by the ionic attraction between opposite charges. Thus, in the case of the jute 24 which normally has a negative ionic charge as illustrated by the negative symbols 27 in FIGURE 5, the cationic sealant 26, whose positive charge is illustrated by the plus symbols 28, is drawn through the interstices 29 between the jute fibers 30 by said ionic attraction between the opposite charges.

The thus established penetration is of such a nature as not only to fill the interstices between the fibers, but to fill the region 31 adjacent the interior 32 of the gas main 10 and between the end edge 19 of the spigot 18 and the seal portion 23 of the bell 21, operably to embrace the fibers 30 within the sealant 26 in said region 31.

The excess liquid sealant 26 is then pumped out of the gas main 10 as by means of the pump 15, and back into the reservoir 16 for re-use for sealing other vessels; and for the purpose of this pumping operation, suitable venting may be used such as opening the cut-off valve 13. A residue of the sealant 26 will however have the wet interior 32 of the gas main 10 operably to coat the same; and the combination of ionic and capillary attraction between the sealant and the fibers 30 is so much greater than the withdrawing action of the pump 15, that virtually no sealant is lost from the region 31. The conduit 14 may then be removed from the fitting 12, the cut-off valve 13 is fully opened, and the gas main 10 allowed to resume its normal operation of conveying gas. The flow of gas therethrough tends to aspirate moisture from the sealant which has wet the interior 32 of the main 10, and from the sealant in the region 31, operably to dry the same. As drying takes place, the latex in the sealant coagulates and cures to form a tough, rubbery mass 33 reenforced by jute fibers in the region 31, and a thin rubbery film 34 coating the interior 32 of the gas main 10 operably further to protect it from leaks which could possibly form through fissures which had not yet penetrated the interior.

In FIGURE 7 is illustrated the operation of the process of my invention in sealing leaks which are not associated with fibrous packing. Thus, a caulking 35 such for instance as a metallic type caulking may be disposed between the bell 21 and spigot 18. Should a fissure 36 have formed through the caulking 35, or a fissure 37 have formed through the wall of the gas main 10, the process of my invention can be used permanently to remedy the same. Thus, the sealant 26 may be introduced to the gas main 10 by means of the reservoir 16 and pump 15 as heretofore described until the interior is substantially full of sealant. The pressure of the liquid within the main 10 tends to force the liquid sealant through the fissures 36 and 37, and this penetrating action is further enhanced by capillary attraction. When the sealant is then removed from the interior of the gas main 10, as by means of the pump 15, the entire interior will have been wet by the sealant 26 operably to leave a coating thereon. As this coating dries, whether by flow of gas through the main or by normal drying action, the latex in the sealant coating the interior coagulates leaving a film 38 throughout the interior and joining the latex plugs 39 in the fissures 36, 37. These latex plugs consist of a tough, rubbery mass. In the case of sealant which comprises a reenforcing agent consisting of filamentous materials 40 for instance as illustrated in magnified form in FIGURE 8, the filamentous materials themselves lend considerable strength to the mass. Moreover, the adhesive attraction of the latex to the filaments supplements the cohesive strength of the latex operably greatly to increase the strength of the plug 39 and to resist any physical force such for instance as street vibration which could possibly tend adversely to affect the seal. However, my invention is not limited to a sealant reinforced by filamentous particles, but contemplates the use of any sealant as defined in the claims.

I have found that such a sealant which has proven satisfactory for this purpose can be made by suspending in water a curing agent, curing accelerator, filler, re-enforcing agent and anti-oxidant, and combining the same with an aqueous solution of dispersing agent, colloid stabilizer and an aqueous dispersion of stabilized latex. This may be done in many different ways, and the following examples are to be taken as illustrative of ways which have proven practical:

EXAMPLE 1

The following ingredients were charged into an 18″ diameter x 18″ long pebble mill half filled with flint pebbles ranging downward in size from approximately ¾" diameter.

| | Pounds |
|---|---|
| Water | 25.00 |
| Carbon black | 7.50 |
| Zinc oxide | 7.50 |
| Sulfur (sublimed) | 1.50 |
| Thiocarbanilide | 1.50 |
| Phenyl beta naphthylamine | 1.50 |
| Sodium hydroxide | 0.04 |
| Tert-dodecyl thioether | 0.15 |
| Ethylene oxide-rosin amine adduct (10% in water) | 4.40 |
| Long chain fatty acid amide | 0.80 |

After grinding for 24 hours with the mill rotating at 30 revolutions/minute, the charge was removed from the mill and added to cationic polychloroprene latex as follows: 73 pounds of cationic polychloroprene latex containing approximately 50% polychloroprene by weight was placed in an agitated vessel, the agitation energy being equivalent to 0.5 horsepower/100 gallons. Tert-dodecyl thioether as a 25% water solution was added in a quantity of 0.10 pound. A 10% aqueous solution of polyvinyl alcohol was added in an amount of 4.5 pounds, both of these stabilizers being added with the agitator running. After the stabilizers were added to the latex and with the agitator still running, the dispersed solids from the ball mill were added to the latex at a uniform rate over a period of 5 minutes. After all of the dispersed solids were added to the latex, agitation was continued for another 5 minutes.

EXAMPLE 2

The following ingredients were charged into an 18" diameter x 18" long pebble mill half filled with flint pebbles ranging downward in size from approximately ¾" diameter.

| | Pounds |
|---|---|
| Water | 25.0 |
| Carbon black | 7.50 |
| Zinc oxide | 750 |
| Sulfur (sublimed) | 1.50 |
| Thiocarbanilide | 1.50 |
| Phenyl beta naphthylamine | 1.50 |
| Sodium hydroxide | 0.04 |
| Tert-dodecyl thioether | 0.15 |
| Sodium sale of lignin sulfonic acid | 0.10 |

After grinding for 24 hours with the mill rotating at 30 revolutions/minute, the charge was removed from the mill end added to anionic polychloroprene latex as follows:

73 pounds of anionic polychloroprene latex containing 50% (approximately) polychloroprene by weight was placed in an agitated vessel, the agitation energy being equivalent to 0.5 horsepower/100 gallons. Tert-dodecyl thioether as a 25% water solution was added in a quantity of 0.10 pound. A 10% aqueous solution of polyvinyl alcohol was added in an amount equal to 4.5 pounds. Both of these stabilizers were added with the agitator running. After the stabilizers were added to the latex, and with the agitator still running, the dispersed solids from the ball mill were added to the latex at a uniform rate over a period of 5 minutes. After all of the dispersed solids were added to the latex, agitation was continued for another 5 minutes to assure uniformity of mixing.

EXAMPLE 3

Same as Example 2 excepting latex used was a copolymer of butadiene and styrene.

EXAMPLE 4

Same as Example 2, excepting latex used was a copolymer of butadiene and acrylonitrile.

EXAMPLE 5

Same as Example 2, excepting that an ammonia free natural rubber latex was used. This was prepared from a commercially available natural rubber latex by adding a 3% aqueous solution of potassium hydroxide at the rate of one pound per 25 pounds of 50% natural rubber latex and blowing nitrogen gas through the latex at a rate of 0.1 cubic foot/minute for 8 hours to remove the ammonia gas.

The foregoing examples are intended to illustrate and should not be inferred to limit. Inded, any elastomeric latex may be used, care being taken to provide a cationic latex in the combination indicated for Example 1, and anionic latex for the combinations indicated in Examples 2 to 5 inclusive.

Thus, also the zinc oxide can be replaced by another curing agent. Such agents which I have found will promote an effective cure include magnesium oxide, and lead oxide; although I have found that zinc oxide is preferable.

The thiocarbanilide is one of several satisfactory low temperature cure accelerators. Another one which I have found satisfactory is thiuramdisulfide.

The phenyl beta naphthylamine can be replaced by phenyl alpha naphthylamine or by any other suitable antioxidant.

The sodium hydroxide can be replaced by lithium hydroxide or potassium hydroxide.

The tert-dodecyl thioether can be replaced by any water soluble non-ionic surface active agent.

The sodium salt of lignin sulfonic acid can be replaced by any suitable anionic water soluble surface active agent, such for instance as either of the agents which may be obtained commercially under the trademark "Emulphor-O-N" or "Aerosol-O-T," said "Emulphor-O-N" being composed of polythylene either stearate, and said "Aerosol-O-T" being composed of dioctyl sodium sulfosuccinate.

The polyvinyl alcohol can be replaced by any suitable soluble stabilizing agent for the latex.

The carbon black can be replaced by any of a large number of other suitable reinforcing agents, such for instance as clays, whiting, selected pigments, and fibers. An effective reinforcing agent was found to be fiber glass of a length between ⅟₁₆" and ¼", introduced at the final agitation stage in place of the milling stage, and preferably of the same specific gravity as that of liquid in which it was introduced. In the case of fiber-type fillers, it was found that the ultimately cured seal was considerably toughened and strengthened by virtue of reducing the distance between anchor locations of the elastomer. The elastomer was thus shortened from anchor location to anchor location, even though the space to be filled by the sealant may have been substantially large. In this way, large fissures and indeed substantial openings in conduits were effectively sealed.

Moreover, for certain purposes a satisfactory sealant was made according to the foregoing examples with less than all the ingredients, or their replacements, specified therein. Thus, it was found that the reinforcing agent such as carbon black or its replacements, the sulphur, the curing accelerator such as the thiocarbanilide or its replacements, antioxidant such as the phenyl beta naphthylamine or its replacement, the latex stabilizer such as the polyvinyl alcohol, and in some instances the long chain fatty acid amide, could variously, severally or all be deleted without preventing a sealant from being made which would be satisfactory for certain purposes. However each of these ingredients contributes substantially to the sealant which I have found most desirable.

Also, in place of milling, other known means of homogenization may be used.

It has also been found that variations may be used in the proportions of ingredients, and still produce a sealant which may be satisfactory for given purposes. For instance, referring to the amounts of milled ingredients specified in Examples 1 and 2, the zinc oxide may be used in amounts between 2 pounds and 12 pounds, the sodium hydroxide may be used in amounts between .04 pound and .50 pound, the tert-dodecyl thioether may be used in amounts between .10 pound and 1.00 pound. The ethylene oxide-rosin amine adduct may be used in amounts between 3.0 pounds and 10.0 pounds, and the long chain fatty acid amide may be used in amounts between .25 pound and 3.00 pounds. The sodium salt of lignin sulfonic acid may be used in amounts between .06 pound and 1.00 pound. And in the latex composition as described prior to the introduction of the milled ingredients, the tert-dodecyl thioether may be used in amounts between .06 pound and 1.0 pound. Also the polyvinyl alcohol may be used in amounts up to 13.5 pounds.

The percentage of water may also be varied. Thus, I have found that my sealant will work satisfactorily for various purposes when the solid content thereof is between 5% and 55%. Above 55% instability may occur. Below 30% there is a substantial reduction in the rate of penetration and deposition.

I also found that, particularly when the packing required to be sealed consists of jute or other organic fiber, that modification of my sealant which includes cationic latex penetrates much more quickly and effectively, the positively charged latex having a marked attraction for the negatively charged organic fibers, not only increasing the speed of penetration, but also substantially increasing the strength of the seal. Not only so, but the ethylene oxide-rosin amine adduct and the long chain fatty acid amide, are corrosion inhibitors which would further contribute to the protection of the conduit or vessel being sealed.

Moreover, the sealant of my invention is non-toxic, non-volatile, non-explosive, non-flammable when in liquid form, and non-flammable when in coagulated form when the latex is polychloroprene, and inert in the presence of aliphatic hydrocarbons such for instance as illuminating gas, and may be introduced into a conduit and withdrawn therefrom as described hereinabove without coagulation, so that the thus withdrawn sealant can be used again and again in the same manner. Not only so, but when thus introduced and withdrawn it not only penetrates and seals the joints, fibers and fissures, but it also leaves a thin film about the interior of the conduit or vessel, which coagulates and cures into a permanent seal against future fissures that may form in the conduit or vessel structure. This film, in the case of the product of Examples 1 and 2, may have a thickness of .002 inch to .003 inch. Also, the penetrated fissures, fibers, openings and joints are very substantially strengthened by the resultant coagulated and cured sealant, particularly when a reinforcing agent is contained therein.

The term "vessel," used in the title and the claims, is intended to include conduits, reservoirs, vessels or containers which are treated by the method of this invention.

I am aware that the invention may be embodied in other specific forms without departing from the spirit or essential attributes thereof, and I therefore desire the present embodiment to be considered in all respects as illustrative and not restrictive.

Having thus described my invention, what I claim as new and desire to secure by Letters Patent is:

1. A gas-tight vessel comprising an interior wall, an exterior wall, and an interstice therebetween, a coagulated and cured, cationic, neoprene latex sealant coating adhering to said interior wall in the vicinity of said interstice, and plugging said interstice against gas leakage, said coagulated latex coating composition being the coagulated and cured product of the aqueous dispersion of a cationic neoprene latex, a cationic surface active agent, a non-ionic surface active agent, of a total solids content in the range of about 5 to about 55% by weight, the cationic surface active agent being in an amount in the range of about 0.5 to about 6% by weight, the non-ionic surface active agent in an amount less than the cationic surface active agent and in the range of about 1.2 to about 5% by weight, said dispersion having an ionic charge opposite to that of the ionic charge of the walls defining the interstice and being stable and non-coagulating prior to and after withdrawal from and after having coated the interior of said vessel.

2. The vessel of claim 1 further comprising a jute packing disposed in said interstice, the fibers of said jute packing being embraced within and reenforcing said coagulated latex coating composition against gas leakage.

3. The vessel of claim 1 which defines a multiplicity of fissures which are sealed against gas leakage by the latex sealant composition.

4. The vessel of claim 1 in which the sealant further comprises a curing agent and a low temperature cure accelerator.

5. The gas-tight joint of claim 1 further comprising a caulking.

6. The joint of claim 5 in which the caulking is metallic.

7. The gas-tight vessel of claim 1 which is a gas main.

8. The gas-tight vessel of claim 3 in which a coating of the sealant composition on the interior of the vessel connects the sealed fissures.

9. The gas-tight vessel of claim 1 further comprising a filamentous reenforcing agent distributed in the sealant composition in the interstice.

10. The gas-tight vessel of claim 1 further comprising carbon black, distributed in the sealant composition in the interstice.

11. The gas-tight vessel of claim 1 in which the sealant composition is cured without application of heat.

12. The vessel of claim 1 in which the coating is selected from one of the following copolymers of butadiene and styrene and butadiene and acrylonitrile.

13. The vessel of claim 3 in which the coating further comprises fiber glass.

14. The vessel of claim 3 in which the coating further comprises polyvinyl alcohol.

15. A gas-tight vessel comprising an interior wall, an exterior wall, and an interstice therebetween, a coagulated and cured, anionic, neoprene latex sealant coating adhering to said interior wall in the vicinity of said interstice, and plugging said interstice against gas leakage, said coagulated latex coating composition being the coagulated and cured product of the aqueous dispersion of an anionic neoprene latex, an anionic surface active agent, a non-ionic surface active agent, of a total solids content in the range of about 5 to about 55% by weight, the anionic surface active agent being in an amount in the range of about 0.5 to about 6% by weight, the non-ionic surface active agent in an amount less than the anionic surface active agent and in the range of about 1.2 to about 5% by weight, said dispersion having an ionic charge opposite to that of the ionic charge of the walls defining the interstice and being stable and non-coagulating prior to and after withdrawal from and after having coated the interior of said vessel.

References Cited

UNITED STATES PATENTS

| | | | |
|---|---|---|---|
| 2,094,691 | 10/1937 | Williams | 285—295 X |
| 2,791,567 | 5/1957 | Lowe et al. | 260—611 X |
| 2,837,122 | 6/1958 | Shaw et al. | 106—33 X |
| 2,885,299 | 5/1959 | Labino | 117—2 |
| 2,912,350 | 11/1959 | Videen et al. | 260—29.7 X |
| 2,995,512 | 8/1961 | Weidner et al. | 117—163 X |
| 2,851,061 | 9/1958 | Bernard et al. | 138—97 |

DAVID J. WILLIAMOWSKY, Primary Examiner

D. W. AROLA, Assistant Examiner